Figure 1:
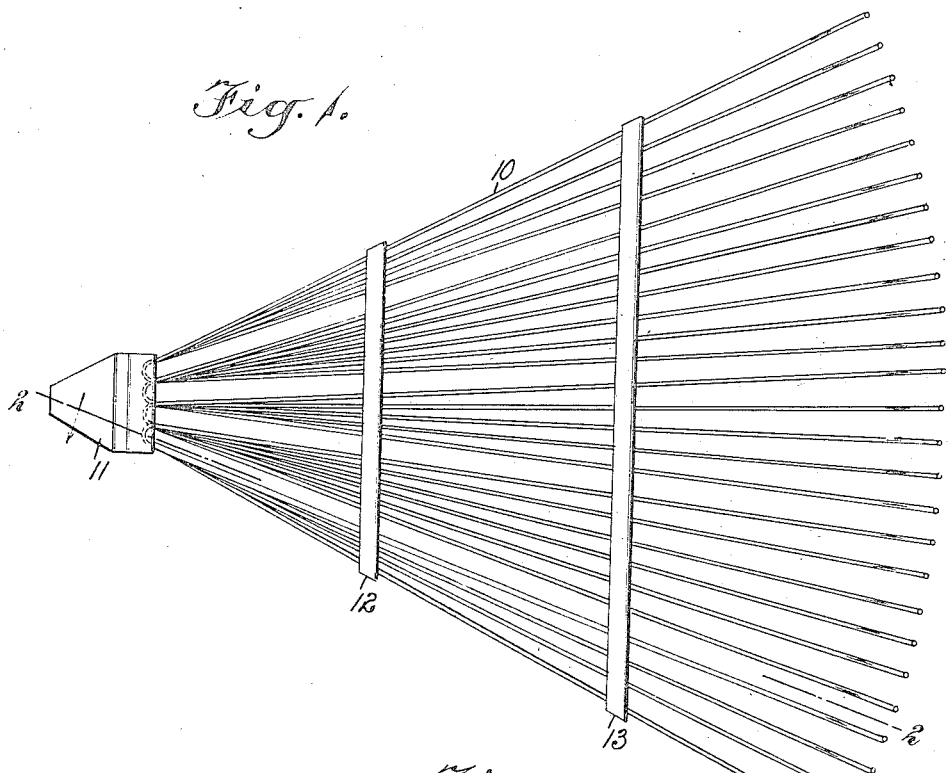

H. G. KIMBER.
RAKE.
APPLICATION FILED SEPT. 6, 1916.

1,210,175.

Patented Dec. 26, 1916.

WITNESSES
Geo. W. Naylor
J. L. McAuliffe

INVENTOR
H. G. Kimber
BY Munn & Co
ATTORNEYS

UNITED STATES PATENT OFFICE.

HERBERT G. KIMBER, OF OAKLAND, CALIFORNIA.

RAKE.

1,210,175.	Specification of Letters Patent.	Patented Dec. 26, 1916.

Application filed September 6, 1916. Serial No. 118,660.

*To all whom it may concern:*

Be it known that I, HERBERT G. KIMBER, a citizen of the United States, and a resident of Oakland, in the county of Alameda and State of California, have invented a new and Improved Rake, of which the following is a full, clear, and exact description.

My invention relates to a wire rake for garden and lawn purposes, and particularly to a rake head in which the wire tines spread in fan-like form from the handle end.

Objects of the invention are to provide a holding and bracing means for the wire tines whereby to provide the maximum number of tines in the rake without producing an unsightly bunching of the tines at the handle; to provide a construction affording perfect freedom of movement to the tines to obtain the maximum resiliency thereof for effective work while at the same time the tines are prevented from twisting or other distortion; to provide tines so formed and arranged as to give the even smooth drag so much to be desired; and to provide a construction that permits the free front ends of the tines being cut off when worn and a new end formation readily produced without disturbing the tine holding and bracing means.

Other important objects of the invention and the advantages of the novel features will more clearly appear as the description proceeds.

Reference is to be had to the accompanying drawings forming a part of this specification in which similar reference characters indicate corresponding parts in all the views.

Figure 2:
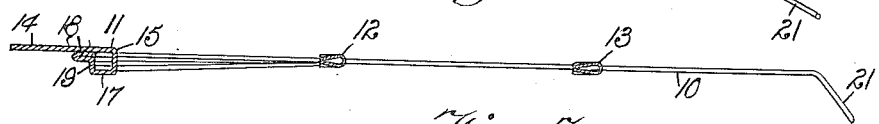
Figure 3:
Figure 4:
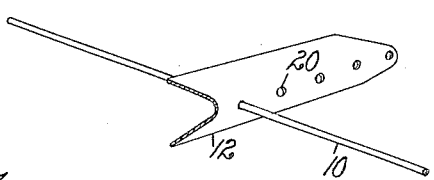
Figure 5:
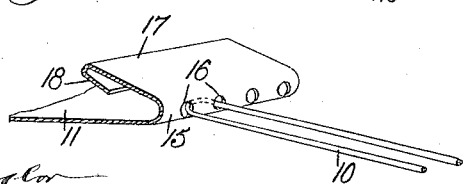

Figure 1 is a plan view of a rake head embodying my invention; Fig. 2 is a longitudinal vertical section on the line 2—2, Fig. 1; Fig. 3 is a top view of one of the double tine members; Fig. 4 is a fragmentary perspective view showing a portion of one of the tine spreading and bracing bars; Fig. 5 is a fragmentary perspective view of a portion of a tine attaching device, and a fragment of one of the double tines.

In constructing a rake embodying my invention, the tines 10 are formed double of U-shape, similar in general to an elongated hair pin, and the tines are secured at their rear ends to an attaching device 11 for securing the same to a handle (not shown), and forward of the attaching device 11, transverse bars 12, 13 are provided, one in front of the other for spreading and bracing the tines.

In order that the attaching device 11 may be of a small size and yet accommodate the maximum number of tines, said attaching device is formed to receive the tines in groups and is given suitable bends to back up the tines and prevent their rearward displacement. One form for the purpose is illustrated in which the rear end of the attaching device is tapered and provides a member 14 which may be secured to a handle in any suitable manner. The plate forming the attaching device is bent downwardly as at 15 and returned on itself, there being a transverse series of holes 16 produced at the bend to receive the double tines 10. From the bend having the holes 16, the plate is returned at the under side 17 approximately parallel with the main body and the edge 18 of the plate is inturned. As in the illustrated example also, the plate may finally have a vertical bend 19 at the back of the tines so that the said bend 19 and the edge 18 back up the tines at the rear, the same being spaced from the front bend 15 sufficiently to accommodate the bends of the tines.

Fig. 5 illustrates the attaching device 11 after the insertion of the tines and before producing the final bend 19.

It is to be understood that the details with respect to the formation given the tine-holding members of the device 11 may be varied.

The double tines are inserted so the respective arms of a tine pass through adjacent holes 16. The tines are employed in groups, and the size of the holes 16 and the relative size of the tines are such that a series of five holes accommodates a much larger number of individual tines, there being in the example shown a total of 26 single tines. Since the adjacent members of adjacent double tines will pass through the same hole I provide for minimizing the disparity between the number of single tines in the groups emanating from the respective holes. Fig. 1 shows 26 individual tines, the groups containing from the top to bottom, 4, 7, 5, 6, 4. These groups are produced by groups of double tines from top to bottom as follows: 4, 3, 2, 4.

The transverse bars 12, 13 are return bent and are formed with holes 20 to receive the individual tines. The holes 20 in the rear bar 12 are of less distance apart than the holes in the bar 13, so that the individual tines are separated at the bar 13 substantially a uniform distance so as to present a uniform spacing at the diverging front ends of the tines. The members of each bar 12, 13 are flattened down to prevent longitudinal displacement of the bars on the tines. The form and arrangement of the bars 12, 13 while spreading and bracing the tines, permit the maximum freedom of movement to the rake so that portions thereof considered transversely may yield unequally and permit the rake to have an even and smooth bearing on the ground. The tines are thus insured against twisting and distortion while the rake head as a whole has the maximum flexibility for effective work.

The tines extend a substantial distance in front of the forward bar 13 and it will be observed from Fig. 2, that the front ends 21 of the tines are bent forwardly and downwardly at an obtuse angle to the general direction of the tines. The result is that the teeth will exert an even drag without undue digging or catching into the ground or grass while at the same time the arrangement presents the advantages that the teeth at the front when worn may be cut off and again bent downwardly at the same angle to provide a new working formation at the front.

Having thus described my invention, I claim as new, and desire to secure by Letters Patent:

1. A rake including U-shaped double tines, an attaching device for said tines presenting a transverse series of holes, the tines being passed through the said holes in groups, the adjacent members of adjacent groups passing through the same hole, means on the attaching device to prevent displacement of the tines, and transverse bars in front of the attaching device, constituting braces and spreaders for the tines, one bar being forward of the other, the front bar being of greater length than the rear bar, the said bars being of sheet metal returned on itself presenting a cross section approximately U-shape, the bars being flattened, the said bars having holes through which the individual tines extend, the holes in the front transverse bar being spaced a greater distance than the holes in the rear transverse bar.

2. A rake of the class described including wire double tines, an attaching device presenting a transverse series of holes through which the double tines extend in groups, the adjacent tines of adjacent groups passing through the same hole, and a transverse spreader and brace bar having holes therethrough for receiving individual tines.

3. A rake of the class described including wire double tines, an attaching device presenting a transverse series of holes through which the double tines extend in groups, the adjacent tines of adjacent groups passing through the same hole, transverse bars constituting spreaders and braces in front of the attaching device, the said bars having each a series of holes to receive the individual tines, the front bar being of greater length than the rear bar, and the holes therein being spaced a greater distance than the holes in the rear bar.

HERBERT G. KIMBER.

Witnesses:
ALBERT H. EDWARDS,
EVA J. SAWYER.